US011580541B2

United States Patent
O'Hara et al.

(10) Patent No.: US 11,580,541 B2
(45) Date of Patent: Feb. 14, 2023

(54) TRANSACTION AUTHENTICATION PLATFORM

(71) Applicant: STRIPE, INC., South San Francisco, CA (US)

(72) Inventors: Joseph O'Hara, Bray (IE); Gavin Pacini, Lucan (IE); Niall Hogan, Dunboyne (IE); Joseph Kuye, Dublin (IE)

(73) Assignee: STRIPE, INC., South San Francisco, CA (US)

( * ) Notice: Subject to any disclaimer, the term of this patent is extended or adjusted under 35 U.S.C. 154(b) by 60 days.

(21) Appl. No.: 15/763,832

(22) PCT Filed: Sep. 28, 2016

(86) PCT No.: PCT/EP2016/073152
§ 371 (c)(1),
(2) Date: Mar. 27, 2018

(87) PCT Pub. No.: WO2017/055373
PCT Pub. Date: Apr. 6, 2017

(65) Prior Publication Data
US 2018/0285868 A1    Oct. 4, 2018

(30) Foreign Application Priority Data
Sep. 28, 2015    (IE) .................................. 1517064.0

(51) Int. Cl.
*G06Q 20/40* (2012.01)
*G06Q 20/32* (2012.01)
(Continued)

(52) U.S. Cl.
CPC ....... *G06Q 20/401* (2013.01); *G06Q 20/3276* (2013.01); *G06Q 20/3278* (2013.01);
(Continued)

(58) Field of Classification Search
CPC .... G06Q 20/40; G06Q 20/3278; G06Q 20/20; G06Q 20/3674; G06Q 20/32;
(Continued)

(56) References Cited

U.S. PATENT DOCUMENTS 7,020,774 B1 *   3/2006   Cornuejols ........ G06Q 20/3674
                                                    713/168
7,197,638 B1 *   3/2007   Grawrock ........... G06F 21/6218
                                                    726/30
(Continued)

FOREIGN PATENT DOCUMENTS

WO    WO-2005001618 A2 *   1/2005   ............. G06Q 20/04
WO       2009112793 A1      9/2009
(Continued)

OTHER PUBLICATIONS

PCT/EP2016/073152. International Search Report & Written Opinion (dated Dec. 20, 2016).

*Primary Examiner* — Alexander G Kalinowski
*Assistant Examiner* — Sanjeev Malhotra
(74) *Attorney, Agent, or Firm* — Womble Bond Dickinson (US) LLP

(57) ABSTRACT

A method and system are disclosed in an electronic payment network, for associating a payment card of a cardholder with a personal computing device of the cardholder, then authenticating the payment card in electronic transactions processed in the network. The card and a device activation code are input to the cardholder device by the cardholder, then communicated sent to a remote server for obtaining a card token. The server generates a device token and an authorisation token, stores the generated tokens together with the card token, and sends the card and device tokens to the cardholder device for storage. Whenever a transaction is processed in the network, the payment card is authenticated by inputting authenticating data to the cardholder device for (Continued)

generating an authorisation token, which is sent to the server with the stored card and device tokens, for a matching operation against the card, device and authorisation tokens at the server.

26 Claims, 6 Drawing Sheets

(51) Int. Cl.
*G06Q 20/38* (2012.01)
*G06Q 20/34* (2012.01)
(52) U.S. Cl.
CPC ............ *G06Q 20/34* (2013.01); *G06Q 20/382* (2013.01); *G06Q 20/385* (2013.01); *G06Q 20/40145* (2013.01)
(58) Field of Classification Search
CPC ............. G06Q 20/385; G06Q 20/3229; G06Q 20/401; G06Q 20/42; G06Q 20/352; G06Q 20/4012; G06Q 20/409; G06Q 2220/00; G06Q 20/202; G06Q 20/341; G06Q 20/351; G06Q 20/3829; G06Q 20/4018; G06Q 20/425; G06Q 20/204; G06Q 20/3224; G06Q 20/3226; G06Q 20/325; G06Q 20/34; G06Q 20/36; G06Q 20/363; G06Q 20/3821; G06Q 20/38215; G06Q 20/3825; G06Q 20/02; G06Q 20/105; G06Q 20/206; G06Q 20/3223; G06Q 20/355; G06Q 20/3552; G06Q 20/367; G06Q 20/382; G06Q 20/3823; G06Q 20/4014; G06Q 20/40145; G06Q 40/00; H04L 63/0853; H04L 2209/56; H04L 67/306; H04L 9/3234; H04L 63/126; H04L 63/083; H04L 2463/102; H04L 63/0428; H04L 63/08; H04L 63/0823; H04W 12/06; H04W 12/02; H04W 12/10; G06F 21/34; G06F 2221/2129; G07F 7/1008; G07F 7/088; G06K 19/06206
USPC ... 705/16, 17, 18, 26.41, 41, 44, 67, 71, 72, 705/3, 4, 26.1, 36 R, 37, 307, 14.27, 705/14.62, 21, 26.61, 27.1, 65, 73; 709/204; 235/380, 375, 382; 455/411, 455/558, 456.3; 380/278; 707/E17.014; 348/E7.083; 717/100; 715/733; 726/30; 713/168; 702/19

See application file for complete search history.

(56) References Cited

U.S. PATENT DOCUMENTS

| | | | | |
|---|---|---|---|---|
| 8,423,950 B2* | 4/2013 | Dettinger | ............. | G06F 9/5038 717/100 |
| 2002/0174071 A1* | 11/2002 | Boudou | ................ | H04L 69/329 705/41 |
| 2004/0049355 A1* | 3/2004 | Maus | ..................... | A61B 5/157 702/19 |
| 2005/0119978 A1* | 6/2005 | Ates | ....................... | G06Q 20/04 705/67 |
| 2007/0043647 A1* | 2/2007 | Bickford | ................ | G06Q 40/04 705/37 |
| 2008/0082452 A1* | 4/2008 | Wankmueller | ..... | G06Q 20/4012 705/72 |
| 2008/0133378 A1* | 6/2008 | Tobin | ..................... | G06Q 40/12 705/26.1 |
| 2009/0060199 A1* | 3/2009 | von Mueller | ......... | G06F 21/606 380/278 |
| 2009/0083372 A1* | 3/2009 | Teppler | ................. | H04L 9/3297 380/277 |
| 2009/0144202 A1* | 6/2009 | Hurry | ............. | H04N 21/47815 705/73 |
| 2009/0282192 A1* | 11/2009 | Maus | ................... | A61B 5/7275 705/41 |
| 2010/0161512 A1* | 6/2010 | Tanpoco | ................. | G06Q 40/04 705/37 |
| 2010/0217657 A1* | 8/2010 | Gazdzinski | ............. | G06F 3/044 705/14.62 |
| 2010/0312656 A1* | 12/2010 | Rosen | ..................... | G06T 11/60 715/733 |
| 2011/0078245 A1* | 3/2011 | Kiffer | .................. | G06Q 20/355 709/204 |
| 2011/0119155 A1* | 5/2011 | Hammad | ............... | G06Q 20/42 235/382 |
| 2011/0145165 A1* | 6/2011 | Haldes | .................... | G06Q 40/04 705/37 |
| 2011/0202466 A1* | 8/2011 | Carter | ............... | G06Q 20/3224 705/67 |
| 2011/0237223 A1* | 9/2011 | Coppinger | ......... | G06Q 20/3278 455/411 |
| 2011/0237224 A1* | 9/2011 | Coppinger | ......... | G06Q 20/3278 455/411 |
| 2011/0238579 A1* | 9/2011 | Coppinger | ............. | G06Q 20/40 705/67 |
| 2011/0238580 A1* | 9/2011 | Coppinger | ............ | H04L 67/306 705/65 |
| 2011/0244920 A1* | 10/2011 | Coppinger | ............. | G06Q 20/20 455/558 |
| 2011/0246317 A1* | 10/2011 | Coppinger | ............ | H04L 67/306 705/17 |
| 2011/0251955 A1* | 10/2011 | Lam | ...................... | G06Q 20/353 705/41 |
| 2012/0018506 A1* | 1/2012 | Hammad | ................ | G06Q 20/40 235/375 |
| 2012/0029303 A1* | 2/2012 | Shaya | .................. | A61B 5/0022 348/E7.083 |
| 2012/0116965 A1* | 5/2012 | Coppinger | ............ | H04W 12/06 705/41 |
| 2012/0215676 A1* | 8/2012 | Driscoll | ................. | G06Q 40/04 705/37 |
| 2012/0231844 A1* | 9/2012 | Coppinger | ......... | G06Q 20/3278 455/558 |
| 2012/0290396 A1* | 11/2012 | Petrov | .................. | G06Q 10/087 455/456.3 |
| 2012/0290611 A1* | 11/2012 | Petrov | ................. | G06Q 30/0241 707/E17.014 |
| 2012/0296818 A1* | 11/2012 | Nuzzi | .................. | G06Q 20/354 705/41 |
| 2012/0303476 A1* | 11/2012 | Krzyzanowski | ........ | G06F 16/00 705/26.61 |
| 2013/0159210 A1* | 6/2013 | Carrigan | ................ | G06Q 40/04 705/36 R |
| 2013/0218695 A1* | 8/2013 | Brooks | .................. | G06Q 20/20 705/17 |
| 2013/0254112 A1* | 9/2013 | Hammad | ............... | G06Q 20/40 705/44 |
| 2013/0254117 A1* | 9/2013 | Von Mueller | ....... | G06Q 20/3829 705/71 |
| 2013/0311247 A1* | 11/2013 | Wass | ..................... | G06Q 30/04 705/40 |
| 2014/0122272 A1* | 5/2014 | Arzumanyan | ......... | G06Q 20/20 705/21 |
| 2014/0156487 A1* | 6/2014 | Fox | ..................... | G06Q 30/0605 705/37 |
| 2014/0195425 A1* | 7/2014 | Campos | ............. | G06Q 20/3674 705/41 |
| 2014/0258071 A1* | 9/2014 | Tilly | ...................... | G06Q 40/04 705/37 |
| 2014/0263625 A1* | 9/2014 | Smets | .................. | G07F 7/0893 235/380 |
| 2014/0297511 A1* | 10/2014 | Haldes | .................... | G06Q 40/06 705/37 |

(56) References Cited

U.S. PATENT DOCUMENTS

| | | | |
|---|---|---|---|
| 2014/0330722 A1* | 11/2014 | Laxminarayanan | G06Q 20/3227 705/44 |
| 2014/0343973 A1* | 11/2014 | Ruszala | G06Q 10/1057 705/4 |
| 2015/0058194 A1* | 2/2015 | Slezak | G06Q 10/0635 705/37 |
| 2015/0066768 A1* | 3/2015 | Williamson | G06Q 20/405 705/44 |
| 2015/0088738 A1* | 3/2015 | Cateland | G06Q 20/227 705/41 |
| 2015/0142550 A1* | 5/2015 | Owen | G06Q 30/0226 705/14.27 |
| 2015/0161608 A1* | 6/2015 | Gilbert | G06Q 20/4014 705/44 |
| 2015/0199754 A1* | 7/2015 | Greystoke | G06Q 30/0645 705/307 |
| 2015/0248723 A1* | 9/2015 | Chandi | G06Q 20/12 705/27.1 |
| 2015/0287031 A1* | 10/2015 | Radu | G06K 7/10009 705/18 |
| 2015/0339664 A1* | 11/2015 | Wong | G06Q 20/4015 705/71 |
| 2015/0339667 A1* | 11/2015 | Dua | G06Q 20/327 705/16 |
| 2016/0019646 A1* | 1/2016 | Gedeon | G06Q 40/04 705/36 R |
| 2016/0078535 A1* | 3/2016 | Ding | G06Q 40/04 705/37 |
| 2016/0092878 A1* | 3/2016 | Radu | G06Q 20/4012 705/72 |
| 2016/0307183 A1* | 10/2016 | Faith | G06Q 20/325 |
| 2016/0371688 A1* | 12/2016 | Hammad | H04L 63/102 |
| 2017/0076291 A1* | 3/2017 | Cairns | G06Q 20/363 |
| 2017/0221054 A1* | 8/2017 | Flurscheim | G06Q 20/3276 |
| 2017/0228733 A1* | 8/2017 | Jordan | G06Q 30/0609 |
| 2017/0235909 A1* | 8/2017 | Lozano | G16H 40/20 705/3 |
| 2017/0243211 A1* | 8/2017 | Dimmick | H04L 67/52 |
| 2017/0364911 A1* | 12/2017 | Landrok | G06Q 20/3825 |
| 2018/0006821 A1* | 1/2018 | Kinagi | G06Q 20/4015 |
| 2018/0053157 A1* | 2/2018 | Roffey | G06K 19/06206 |
| 2018/0068318 A1* | 3/2018 | Pastore | G06Q 20/363 |
| 2018/0255460 A1* | 9/2018 | Hammad | G06Q 20/38215 |
| 2018/0293569 A1* | 10/2018 | Bhinder | G06Q 20/40 |
| 2018/0308093 A1* | 10/2018 | Oder, II | G06Q 20/20 |
| 2018/0308095 A1* | 10/2018 | Hammad | H04L 9/321 |
| 2019/0182230 A1* | 6/2019 | Wong | H04W 12/068 |
| 2019/0251550 A1* | 8/2019 | Tamari | G06Q 30/0621 |
| 2019/0279196 A1* | 9/2019 | Pendse | G06Q 20/308 |

FOREIGN PATENT DOCUMENTS

| | | |
|---|---|---|
| WO | 2015011655 A1 | 1/2015 |
| WO | 2015054697 A1 | 4/2015 |

* cited by examiner

TRANSACTION AUTHENTICATION PLATFORM

FIELD

The present invention relates to a transaction authentication platform. More particularly, the present invention relates to a distributed method and a corresponding system for improving multifactor authentication of a payment card during the distributed processing of an electronic transaction.

BACKGROUND

Technical developments are ongoing in the electronic payments industry to implement payment form factors that increase protection against various forms of fraud. In this context, the three main card schemes Europay, Mastercard and Visa ('EMV') created the original EMV technical standard for payment cards, which is now managed by EMVCo and aspects of which are based upon ISO/IEC 7816 for contact cards and ISO/IEC 14443 for contactless cards.

Payment cards complying to the EMV standard are variously known as smart cards, chip cards and IC cards and store data on integrated circuits rather than magnetically on a stripe. EMV cards were originally contact cards insertable into readers interfacing a point of sale ('PoS') terminal or automated teller machine ('ATM') with the card chip, and are increasingly being replaced with contactless cards that can be read by a PoS or ATM over a short distance using radio-frequency identification ('RFID') technology.

EMV cards provide substantial protection for card-present transactions, i.e. those transaction conducted between a cardholder and a merchant at a till or the like and wherein the card is physically interfaced with a PoS, but there remains a need to minimise unauthorised use of cardholder account data and to reduce fraud opportunities for card-not-present transactions, typically those conducted over the phone or the Internet, and emerging transaction environments which combine elements of card-present and card-not-present transactions, such as contactless transactions at a retail location.

A recent development path that shows promise for solving the above issue is payment tokenisation systems. In most of these systems, a payment token is implemented as a surrogate replacing the number uniquely identifying a payment card within electronic payment networks, which is known as the Primary Account Number (PAN) of the card. Accordingly, it is known to use payment tokens in Cardholder Verification Methods (CVMs), including signature, online and offline PIN, and outside CVMs. For example, if an online PIN is used with a payment token, in accordance to ISO 9564-1 PIN Block Format 0 or Format 3, the PIN block would include the payment token in lieu of the card's PAN. In this context, token service providers are responsible for ensuring that the issuer of the payment card receives the PIN block with the PAN or payment token, as appropriate, for validation.

In these systems, a process must be followed to ensure that the payment token is replacing a PAN which is legitimately being used by the token requestor. This process is known as Identification and Verification (ID&V) and is performed each time a payment token is requested. Different types of ID&V may be performed, resulting in corresponding levels of token assurance, wherein no or minimal ID&V performed would result in a low assurance payment token, but a high level of ID&V would result in a high assurance payment token.

Higher levels of ID&V rely on multifactor authentication techniques, typically 2 factors currently and, in that context, the three domain ('3D') Secure authentication protocol first deployed by Visa under the name 'Verified by Visa' and since adopted by other Card Schemes such as MasterCard and its MasterCard SecureCode, can be used as one of the two factors. A fundamental requirement of the 3-D Secure protocol is the enrolment of a payment card in the service prior to the successful completion of an authenticated transaction. This can be implemented as a stand-alone process or integrated with an online retail event, and its purpose is both to validate the identity of the cardholder prior to use of the payment card and to assign a means of authentication to that card. The cardholder is presented with a user interface, typically a succession of at least two secure browser pages, before the enrolment process is complete and a transaction can be completed. However, the card industry reports that as many as 52 percent of users opt out of 3-D Secure participation when first presented by the user interface, and an additional 18 percent close the activation window altogether. Each cardholder opting out of 3-D Secure when prompted to enroll, is an example of a cardholder being inconvenienced by the enrolment-based system, eventually leading to dissatisfaction and abandonment of purchases by legitimate consumers.

Accordingly, there is a clear requirement for improving multifactor authentication of a payment card during the distributed processing of an electronic transaction.

SUMMARY

The present invention mitigates the ergonomic deficiencies and other grounds of user unfriendliness inherent to the prior art techniques, that currently result in user reticence to ID&V enrolment, by pairing a personal computing device of a user or cardholder, for instance a user's cardholder's mobile telephone handset, with a payment card of the cardholder or user account information, without storing the Primary Account Number ('PAN') of the payment card, by tokenising the payment card or user account information with a high level of ID&V, that is assured through a security protocol. It will be appreciated different payment platforms other than EMV based can also be employed to implement the present invention. In the context of the present invention the method and system can be used effectively for online transactions or where a transaction is happening at a physical merchant terminal.

According to an aspect of the present invention therefore, there is provided a method of associating a payment card of a cardholder with a personal computing device of the cardholder in an electronic payment network. The method comprises the steps of providing the cardholder with the card and a device activation code for the personal computing device, wherein the card has a number uniquely identifying the card in the electronic payment network; communicating the card number and the device activation code from the personal computing device to a first remote server; at the first remote server, obtaining an issuer assured card token based on both the card number and the device activation code from a second remote server; generating a device token and an authorisation token at the first remote server; storing the card token, device token and authorisation tokens in a data structure at the first remote server; and communicating the card token and device token to the personal computing device and storing same thereat. It will be appreciated that the functions carried out by the first and second server can be carried out on a single server or a plurality of servers depending on the implementation required.

This approach advantageously leverages the paired device as a first factor in a multifactor authentication solution and, further, obviating the requirement for the cardholder to interact with a security protocol, such as 3D Secure user interface or the like, at a later time during a transaction.

In an embodiment of the associating method, the step of obtaining the issuer assured card token or token may comprise the further steps of communicating the card number and the device activation code from the first remote server to the second remote server; verifying the respective validities of the card number and the device activation code at the second remote server with an issuer of the card; and generating the issuer assured card token in case of a positive verification at the second remote server.

The issuer assured card token may be an EMV issuer assured card token and, in this embodiment of the associating method, the step of verifying preferably comprises the further step of processing the card number and the device activation code with a 3D Secure protocol.

In an embodiment of the associating method, the card number is a primary account number (PAN) and the step of communicating the card number to the first remote server may comprise the further step of inputting the PAN in the personal computing device through a near field communication (NFC). In an embodiment the step of inputting the PAN in the personal computing device can be performed by manual means or optical means.

In an embodiment of the associating method, the method may comprise the further steps of communicating the card number and the device activation code from the first server to the personal computing device; and the step of communicating the card token and the personal computing device token to the personal computing device comprises the further steps of communicating the card token and the personal computing device token for processing. The communication can use a Public-Key Infrastructure (TLS) or other encryption communication techniques. It will be appreciated that the personal computing device can take the function of a merchant terminal device.

In an embodiment of the associating method, the step of generating an authorisation token may comprise the further step of generating the authorisation token based on at least one selected from the card number, card data, an image or photograph of the card, cardholder data, cardholder biometric data, one or more cardholder physical feature(s), one or more cardholder's facial feature(s), a cardholder's iris, a cardholder's fingerprint(s), a cardholder's vocal features.

This approach advantageously builds further on the paired device leveraged as a first factor in a multifactor authentication solution, by using other hardware features and associated functionality of the paired device, particularly the wireless networking means and/or imaging means of the means, to provide at least a second authentication factor, and possibly more factors still depending on the degree of token assurance required by an implementation context.

According to another aspect of the present invention, there is also provided a method of authenticating a payment card of a cardholder for an electronic transaction processed in an electronic payment network. The authenticating method comprises the steps of associating the payment card with a personal computing device of the cardholder as described herein; initiating the electronic transaction at a merchant terminal remote from the personal computing device and the first remote server; generating a transaction token associated with the electronic transaction at the first remote server; communicating the transaction token to the personal computing device; inputting authenticating data in the personal computing device and generating an authorisation token based on the input data; communicating, from the personal computing device, the stored card token, the stored personal computing device token, the generated authorisation token and the communicated transaction token to the first remote server; at the first remote server, comparing tokens received from the personal computing device against the stored card token, personal computing device token and authorisation token; and authenticating the electronic transaction if the comparison returns a match.

An embodiment of the authenticating method may comprise the further step of updating the transaction token after authenticating the electronic transaction.

An embodiment of the authenticating method may comprise the further steps of encoding a network address of the merchant terminal in the transaction token; and communicating a notification of authentication to the merchant terminal at the network address after authenticating the electronic transaction.

An embodiment of the authenticating method may comprise the further steps of generating a new device token after authenticating the electronic transaction; and updating the stored device token at the first remote server and at the personal computing device with the new device token.

In an embodiment of the authenticating method, the step of inputting authenticating data in the personal computing device may comprise at least one selected from inputting card number or card data through a near field communication (NFC), capturing physical features of the card through optical capturing means of the device, capturing cardholder biometric data through the optical capturing means of the device, inputting cardholder vocal data through audio capturing means of the device.

In an embodiment of the authenticating method, the step of communicating the transaction token to the personal computing device may comprise the further steps of encoding the transaction token in a QR code and communicating the QR code. In an alternative embodiment the transaction token may be encoded in a user-selectable button for rendering in a browser application or other user interface. A particularly ergonomic embodiment of the user-selectable button may be an Intents button of the Android™ operating system.

According to a further aspect of the present invention, there is also provided a distributed electronic transaction processing system comprising at least first and second remote servers and at least one personal computing device of a payment card cardholder connected to a network, wherein the card has a number uniquely identifying the card in the system and wherein the personal computing device is configured to communicate the card number and a device activation code to the first remote server, to receive an issuer assured card token and a device token from the first remote server, and to store the token pair; the second remote server is configured to receive the card number and the device activation code from the first remote server and to generate the issuer assured card token based on same; and the first remote server is configured to obtain the issuer assured card token from the second remote server, to generate the device token and an authorisation token, to store the card token, device token and authorisation tokens in a data structure and to communicate the card token and device token to the personal computing device.

Various embodiments of the system may be devised, wherein the cardholder device, the first remote server and the second remote server are each further configured to implement the various steps of the association and authentication methodologies introduced and described herein.

Accordingly, in an embodiment of the system, the second remote server may be further configured to verify the respective validities of the card number and the device activation code with an issuer of the card, and to generate the issuer assured card token in case of a positive verification.

In another embodiment of the system, the cardholder device preferably comprises wireless networking means, the card number is a primary account number (PAN) and the card number is input to the cardholder device through a near field communication (NFC).

In a further embodiment of the system, the cardholder device is preferably further configured to download a set of instructions from the first remote server for communicating the card number and the device activation code thereto, and the first remote server is further configured to communicate the card token and the device token to the set of instructions.

An embodiment of the system preferably comprises a merchant terminal connected to the network and configured to initiate an electronic transaction, wherein the first remote server is further configured to generate a transaction token associated with the electronic transaction, communicate the transaction token to the personal computing device, compare tokens received from the cardholder device against the stored card token, device token and authorisation token, and to authenticate the electronic transaction if the comparison returns a match; and the cardholder device is further configured to receive authenticating data, to generate an authorisation token based on the authenticating data and to communicate the stored card token, the stored cardholder device token, the generated authorisation token and the communicated transaction token to the first remote server.

In a variant of this embodiment, the first remote server may be further configured to update the transaction token after authenticating the electronic transaction.

In another variant of this embodiment, the first remote server may be further configured to encode a network address of the merchant terminal in the transaction token, and to communicate a notification of authentication to the merchant terminal at the network address after authenticating the electronic transaction.

In a further variant of this embodiment, the first remote server may be further configured to generate a new device token after authenticating the electronic transaction, and to update the stored device token at the first remote server and at the cardholder device with the new device token.

In any of the above variants, the cardholder device preferably comprises wireless networking means and imaging means, and both the cardholder device and the first remote server are further configured to generate the authorisation token based on at least one selected from the card number, card data, an image or photograph of the card, cardholder data, cardholder biometric data, one or more cardholder physical feature(s), one or more cardholder's facial feature(s), a cardholder's iris, a cardholder's fingerprint(s), a cardholder's vocal features.

In any of the above variants again, the first remote server may be further configured to encode the transaction token in a QR code and to communicate the QR code to the cardholder device. Alternatively, the transaction token may be encoded in a user-selectable button for rendering in a browser application or other user interface. The user-selectable button may for instance be embodied as an Intents button of the Android™ operating system.

For any of the above embodiments of the methods and system, the cardholder device is preferably selected from the group comprising: desktop computers, mobile telephone handsets, tablet computers, portable computers, personal digital assistants, portable media players, portable game consoles.

According to an aspect of the present invention therefore, there is provided a method of associating a payment card of a cardholder with a personal computing device of the cardholder in an electronic payment network. The method comprises the steps of providing the cardholder with the card and a device activation code for the personal computing device, wherein the card has a number uniquely identifying the card in the electronic payment network; communicating the card number and the device activation code from the personal computing device to a remote server; at the remote server, obtaining an issuer assured card token based on both the card number and the device activation code from the remote server; generating an authorisation token at the personal computing device; storing the card token, a device token and authorisation tokens in a data structure at the remote server; and communicating the card token and device token to the personal computing device and storing same thereat.

In one embodiment there is provided a method of associating a payment card of a cardholder with a cardholder device of the cardholder in an electronic payment network, the method comprising the steps of:

providing the cardholder with the card and a device activation code for the personal computing device, wherein the card has a number uniquely identifying the card in the electronic payment network;

communicating the card number and the device activation code from the cardholder device to a first remote server;

at the first remote server, generating an issuer assured card token based on both the card number and the device activation code;

generating an authorisation token at the personal computing device and checking at the first remote server;

storing the card token, a device token and authorisation tokens in a data structure at the first remote server; and communicating the card token and device token to the cardholder device and storing same thereat.

It will be appreciated that in the context of the present invention the use of the term 'token' should be afforded the widest possible interpretation and should include any digital token that can be used associated with a user and a user account information.

Other aspects of the invention are defined as set out in the appended claims.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

The words "comprises/comprising" and the words "having/including" when used herein with reference to the present invention are used to specify the presence of stated features, integers, steps or components but does not preclude the presence or addition of one or more other features, integers, steps, components or groups thereof.

Figure 1:
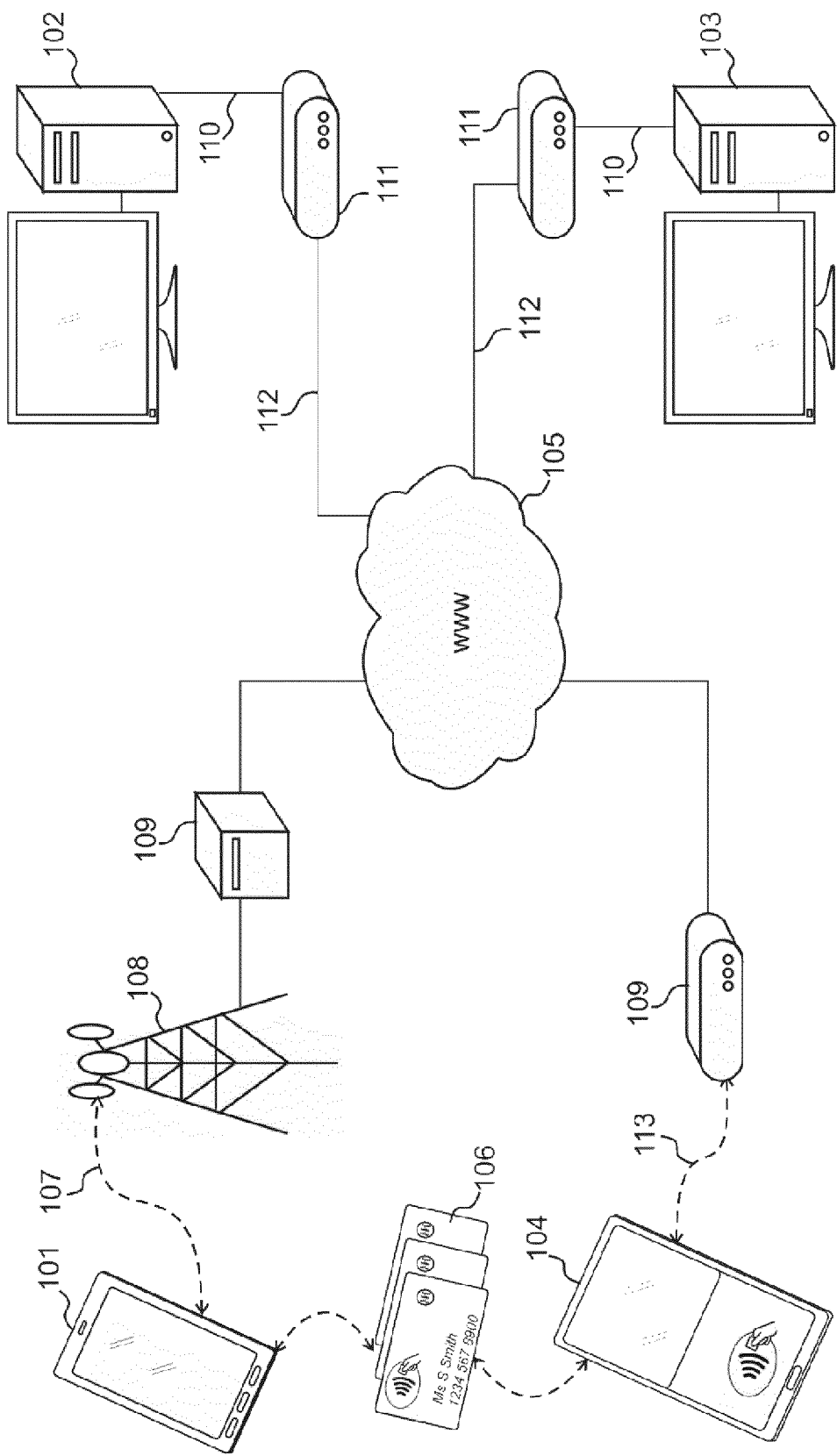
FIG. 1 shows a distributed electronic transaction processing system including a plurality of data processing terminals communicating data across a network, amongst which a cardholder device, a first server, a second server and a merchant terminal, and wherein at least the cardholder device and first server include respective sets of instructions for embodying the tokenisation method according to an embodiment of the present invention.

Referring now to the figures and initially FIG. 1, there is shown a network environment in which several data processing terminals 101, 102, 103, 104 are connected to a Wide Area Network (WAN) 105, in the example the Internet. Network connectivity and interoperable networking protocols of each terminal allow the terminals to connect to one another and communicate data to and receive data from one another according to the methodology described herein.

The data processing terminal 101 is a mobile personal communication device operated by the holder of one or more payment card(s) 106. The cardholder device 101 emits and receives data, including voice and/or alphanumerical data, encoded as a digital signal over a wireless data transmission 107, wherein the signal is relayed respectively to or from the device 101 by the geographically-closest communication link relay 108 of a plurality thereof. The plurality of communication link relays $108_N$ allows digital signals to be routed between mobile devices $101_N$ and their intended recipient by means of a remote gateway 109. Gateway 109 is for instance a communication network switch, which couples digital signal traffic between wireless telecommunication networks, such as the network within which wireless data transmissions 107 take place, and the WAN 105. The gateway 109 further provides protocol conversion if required, for instance if the device 101 uses a Wireless Application Protocol ('WAP') or Secure Hypertext Transfer Protocol ('HTTPS') to communicate data.

The data processing terminal 102 is a first server operated by an Access Control Service ('ACS') provider and is a personal computer device which emits and receives data encoded as a digital signal over a wired or wireless data transmission 110, wherein said signal is relayed respectively to or from the computer 102 by a local router device 111 implementing a wired local network operating according to the IEEE 802.3-2008 Gigabit Ethernet transmission protocol and/or a high-bandwidth wireless local network operating according to the IEEE 802.11 Wi-Fi wireless transmission protocol. The router 111 is itself connected to the WAN 105 via a conventional ADSL or optical fibre connection over a wired telecommunication network 112.

The data processing terminal 103 is a second server operated by a card scheme such as Visa™, Mastercard™, JCB™, American Express™ or the like, and is again a personal computer device which emits and receives data encoded as a digital signal over a wired or wireless data transmission 110, relayed respectively to or from the computer 103 by a local router device 111, itself connected to the WAN 105 via a conventional ADSL or optical fibre connection over a wired telecommunication network 112, as described hereinabove.

The data processing terminal 104 is a point-of-sale ('PoS') terminal operated by a merchant at a retail location, which emits and receives data encoded as a digital signal over a wireless data transmission 113 conforming to the IEEE 802.11 ('Wi-Fi') standard, wherein the signal is relayed respectively to or from the PoS terminal by a local router device 111 interfacing the PoS terminal 104 to the WAN communication network 105. The PoS terminal 104 further comprises a High Frequency Radio Frequency Identification (RFID) networking interface implementing Near Field Communication (NFC) interoperability and data communication protocols for facilitating wireless data communication over a short distance with correspondingly-equipped devices such as the cardholder mobile phone 101 and an NFC-enabled payment card 106 of the cardholder. The PoS terminal 104 may for instance be a ViVOpay™ 4500 contactless POS terminal manufactured by VIVOtech™ or an MX 800™ series terminal manufactured by VeriFone™.

Figure 2:
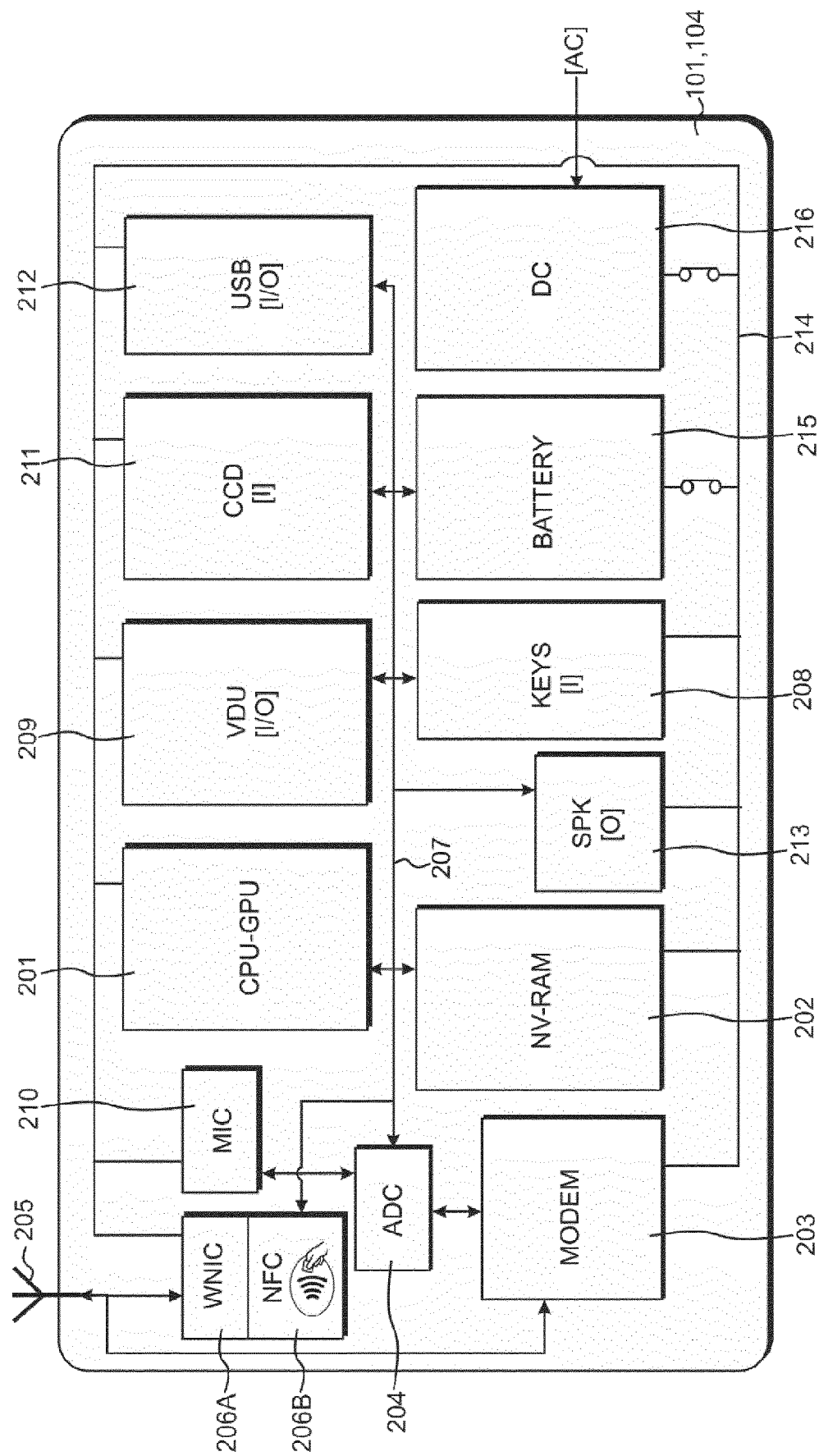
FIG. 2 illustrates a typical hardware structure of the cardholder data processing terminal shown in FIG. 1.

A typical hardware architecture of the cardholder device 101 is shown in FIG. 2 in further detail, by way of non-limitative example. As skilled persons will readily understand, the hardware architecture of the PoS terminal 104 is substantially similar to that of the cardholder device 101 described hereafter, for purposes of ergonomic handling and miniaturisation. Skilled persons will also readily understand that the respective hardware architectures of the first and second servers 102, 103 are also substantially similar to that of the cardholder device 101 and point of sale terminal 102, albeit with components designed for durability and redundancy of operation, by contrast with the components of the mobile phone 101 and PoS 104 designed for improved portability.

The mobile phone 101 thus firstly includes a data processing unit 201, for instance a general-purpose microprocessor, for instance conforming to the Cortex™ architecture manufactured by ARM™, acting as the main controller of the data processing terminal 101 and which is coupled with memory means 202, comprising volatile random-access memory (RAM), non-volatile random-access memory (NVRAM) or a combination thereof.

The cardholder device 101 further includes networking means. Communication functionality in mobile phone 101 is provided by a modem 203, which provides the interface to external communication systems, such as the GPRS, 3G or 4G cellular telephone network 108, 109 shown in FIG. 1, associated with or containing an analogue-to-digital converter 204, which receives an analogue waveform signal through an aerial 205 from the communication link relay 108 and processes same into digital data with the data processing unit 201 or a dedicated signal processing unit. Alternative wireless communication functionality is provided by a wireless network interface card (WNIC) 206A interfacing the mobile phone 101 with the wireless local area network generated by a local wireless router 111. Further alternative wireless communication functionality is provided by a High Frequency Radio Frequency Identification (RFID) networking interface 206B implementing Near Field Communication (NFC) interoperability and data communication protocols for facilitating wireless data communication over a short distance with correspondingly-equipped devices such as the PoS terminal 104 and the NFC-enabled payment card 106 of the cardholder.

The CPU 201, NVRAM 202 and networking means 203 to 206B are connected by a data input/output bus 207, over which they communicate and to which further components of each device 101, 102 are similarly connected in order to provide wireless communication functionality and receive user interrupts, inputs and configuration data. Accordingly, user input may be received from a data input interface 208, which for mobile phone 101 is a keypad with a limited number of multi-functional keys and/or a capacitive or resistive touch screen feature of the display unit 209. Further input data may be received as analogue sound wave data by a microphone 210, digital image data by a digital camera lens 211 and digital data via a Universal Serial Bus (USB) 212. Processed data is output as one or both of display data output to the display unit 209 and audio data output to a speaker unit 213.

Power is supplied to the above components by the electrical circuit 214 of devices 101, 102, which is interfaced with an internal battery module 215, which itself may be recharged on an ad hoc basis by an electrical converter 216.

In the distributed payment system of FIG. 1, the cardholder device 101 and the first server 102 implement association and authentication methods for the or each payment card 106 of the cardholder. The associating method pairs the cardholder device 101 with the or each payment card 106 without storing the Primary Account Number ('PAN') of the payment card in either the cardholder device 101 or the remote server 102. The pairing is implemented by tokenising a payment card 106 on the basis of a one-time code, for instance called a Device Active Code (DAC), that is uniquely associated with the card and representative of the cardholder device 101 at the time of the card-device association process. The tokenising process is performed by the remote server 102 and implements a high level ID&V method in association with the second remote server 103 of the card issuer or, more securely still, the card scheme that provided the PAN to the card issuer for issuing the card, wherein the second remote server 103 is able to process the card and one-time code data through the 3D Secure protocol and return an EMV issuer assured token to the first server 102 for subsequent use during instances of the payment card authenticating method.

Figure 3:
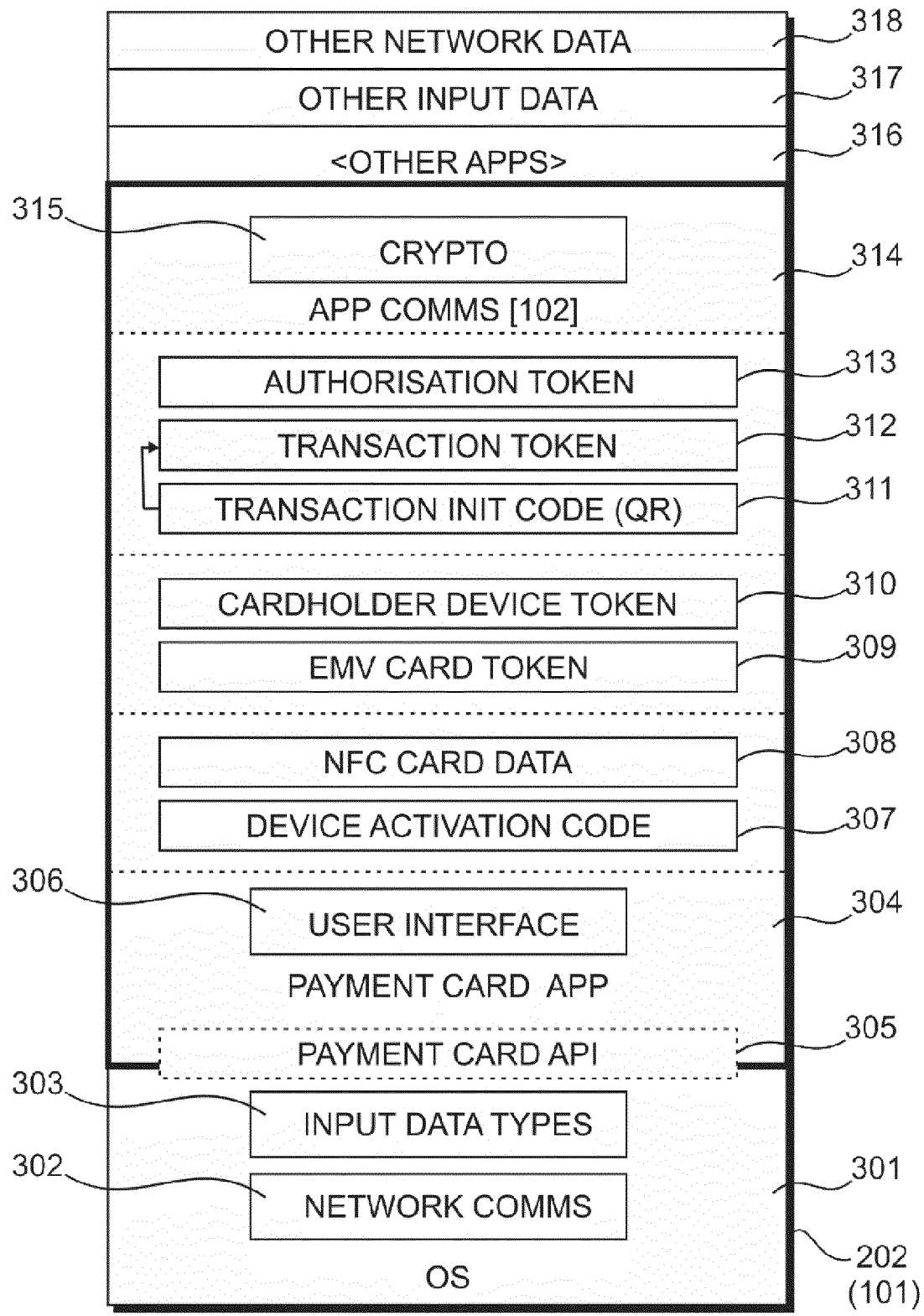
FIG. 3 illustrates the memory contents of the cardholder device at runtime, including a set of instructions and a plurality of tokens, amongst which a card token, a device token, an authorisation token and a transaction token.

Accordingly, with reference now to FIG. 3, a logical diagram shows the contents of the memory means 202 of the cardholder device 101 at runtime, both when the terminal is configured for association with a card and when the terminal is configured for authenticating an associated payment card during an electronic transaction processed by the merchant device 104.

An operating system is shown at 301 which, if the device 101 is for instance an iPhone® mobile phone handset or an iPad® tablet computer manufactured by Apple® Inc. of Sunnyvale, USA, is iOS® likewise distributed by Apple® Inc. or, if the device 101 is for instance an Galaxy® mobile phone handset manufactured by Samsung® Electronics Co., Ltd of Suwon, Republic of Korea, is Android® distributed by Google® Inc.

The OS 301 includes communication subroutines 302 to configure the data processing terminal 101 for bilateral network communication via the modem 203 and both the NIC 206A and the NFC module 206B. The OS 301 also includes input subroutines 303 for reading and processing input data variously consisting of user direct input to the keypad 208 and to the touchscreen interface 209, image data captured by the CCD 211 and audio data supplied by the Digital Analog Converter 204 after processing input from the microphone 210.

Figure 5:
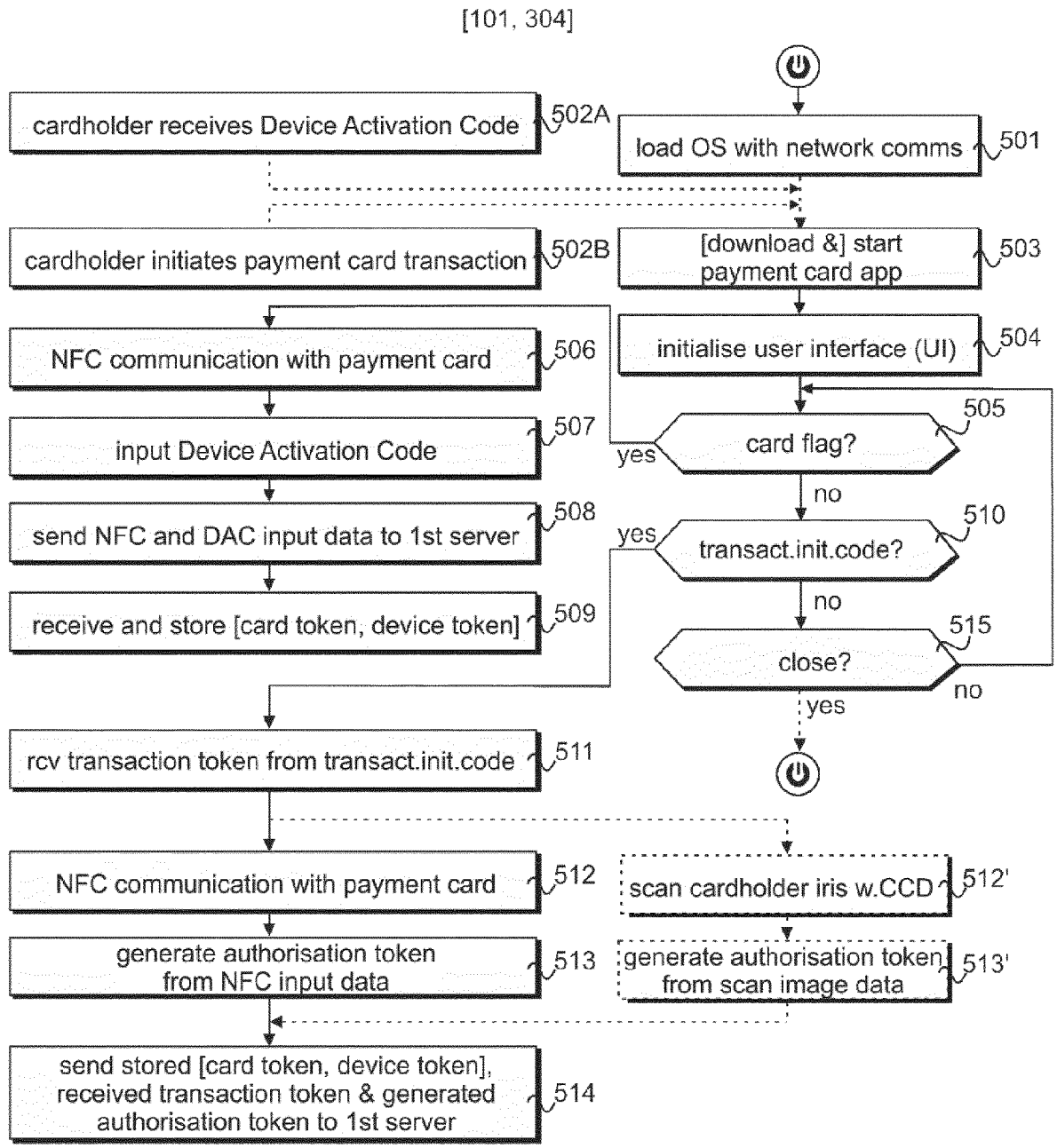
FIG. 5 details data processing steps performed by the cardholder device and the first server for associating a payment card of the cardholder with the cardholder device in the networked system of FIG. 1 according to an embodiment of the present invention.

A payment card application is shown at 304, which configures the cardholder device 101 to perform data processing steps described hereafter with reference to FIG. 5, which embody both the card payment associating and authenticating methods in the electronic payment network of FIG. 1 insofar as the cardholder device 101 is concerned. The application 304 is interfaced with the OS 301, particularly the network communication and input data processing subroutines 302 and 303 of the OS 301, via one or more suitable Application Programmer Interfaces 305. Whenever the functionality of the payment card application 304 is called by a relevant cardholder input or an electronic stimuli (such as a transaction notification for authentication purposes as described hereafter) the payment card application 304 instantiates a user interface 306 on the display 209 to facilitate interaction with the cardholder.

The payment card application 304 can be downloaded to the device 101 from the first remote server 101 via a relevant remote repository server, for instance Apple's App Store™ or Google's Playstore™. In another embodiment an app can be downloaded directly from the likes of Apple's App Store™ or Google's Playstore™. Alternatively, in a preferred embodiment, the payment card application 304 is first downloaded directly from the first remote server 101 when the cardholder receives a device activation code 307 for a payment card 106 from their card issuer in a written communication or electronic message, for instance embodied as a 4-digit PIN code.

The associating method initially requires the cardholder to both input the DAC 307 in the user interface 306 and the device 101 to read data 308 encoded in the payment card 106, via an NFC communication performed by a physical tap of the card 106 against the device 101. The card data 308 is communicated by the cardholder device 101 to the first remote server 102 for obtaining the token 309 which, when the associating method is completed remotely by the first remote server 103, is eventually returned to the mobile application 304 for local storage, together with a unique cardholder device token 310 generated by the first remote server 103.

The authenticating method is initiated at the cardholder device 101 by a transaction initialising code 311, which is preferably embodied as a QR code if the transaction is conducted by the cardholder on a desktop computing device, and as an Intents button if the transaction is conducted by the cardholder on the device mobile 101, wherein the transaction initialising code 311 is in all cases rendered by a browser application (not shown). The transaction initialising code 311 is processed by the OS subroutine 303 according to either a relevant selection input by the cardholder on the touch-sensitive display 209 if the code is an Intents button, or an imaging of the QR code on the desktop computer display with the cardholder device's CCD 211, in either case resulting in a call to instantiate and process the payment card application 304 for purposes of authenticating the payment card 106 involved in the transaction and associated with the cardholder device 101.

The instantiation of the payment card application 304 obtains a transaction token 312 associated with the ongoing electronic transaction from the instantiating transaction initialising code 311. In this embodiment, the authenticating method at the cardholder device 101 again requires the device 101 to read data 308 encoded in the payment card 106 via an NFC communication performed by a physical tap of the card 106 against the device 101, in order to generate an authorisation token 313. Alternative embodiments contemplate generating the authorisation token 313 on the basis of data captured by the device CCD 211, such as a photograph or video frame of either the payment card or physical cardholder biometric feature(s) including the cardholder's iris or fingerprint(s), and/or on the basis of data captured by the device microphone 210 such as a voiceprint of the cardholder, in all cases uniquely representative of the card 106 and cardholder.

The payment card application 304 includes a communications module 314 for communicating card and token data to, and receiving token data from, the first remote server 102 across the networked environment of FIG. 1, wherein all such communications are encoded or decoded with a cryptographic subroutine 315 of the communications module 314 for purposes of data security. Outgoing encoded communications of the payment card application 304 will accordingly include the NFC card data 308 and DAC 308 when the card 106 and cardholder device 101 are being initially associated, and the card token 309, device token 310, transaction token 312 and the generated authorisation token 313 when the card 106 is being authenticated during an electronic transaction. Incoming encoded communications of the payment card application 304 will accordingly include the card token 309 and device token 310 upon association of the card 106 with the cardholder device 101, and the transaction initialising code 311 and transaction token 312 associated with an ongoing electronic transaction.

Further local data 317 and network data 318 may be stored in the memory means 202 of the cardholder device 101 at runtime, some or all of which may be processed either by the application 304, or by or for other application(s) 315 being processed in parallel with the application 304. An example of further local data is for instance local user input 317 read by the OS 301 in real time from the hardware interface 209, but which user input lies outside the user interface 306 of the application 304. An example of further network data is for instance remote application or OS updating data 318 communicated by a remote server over the WAN 105.

Figure 4:
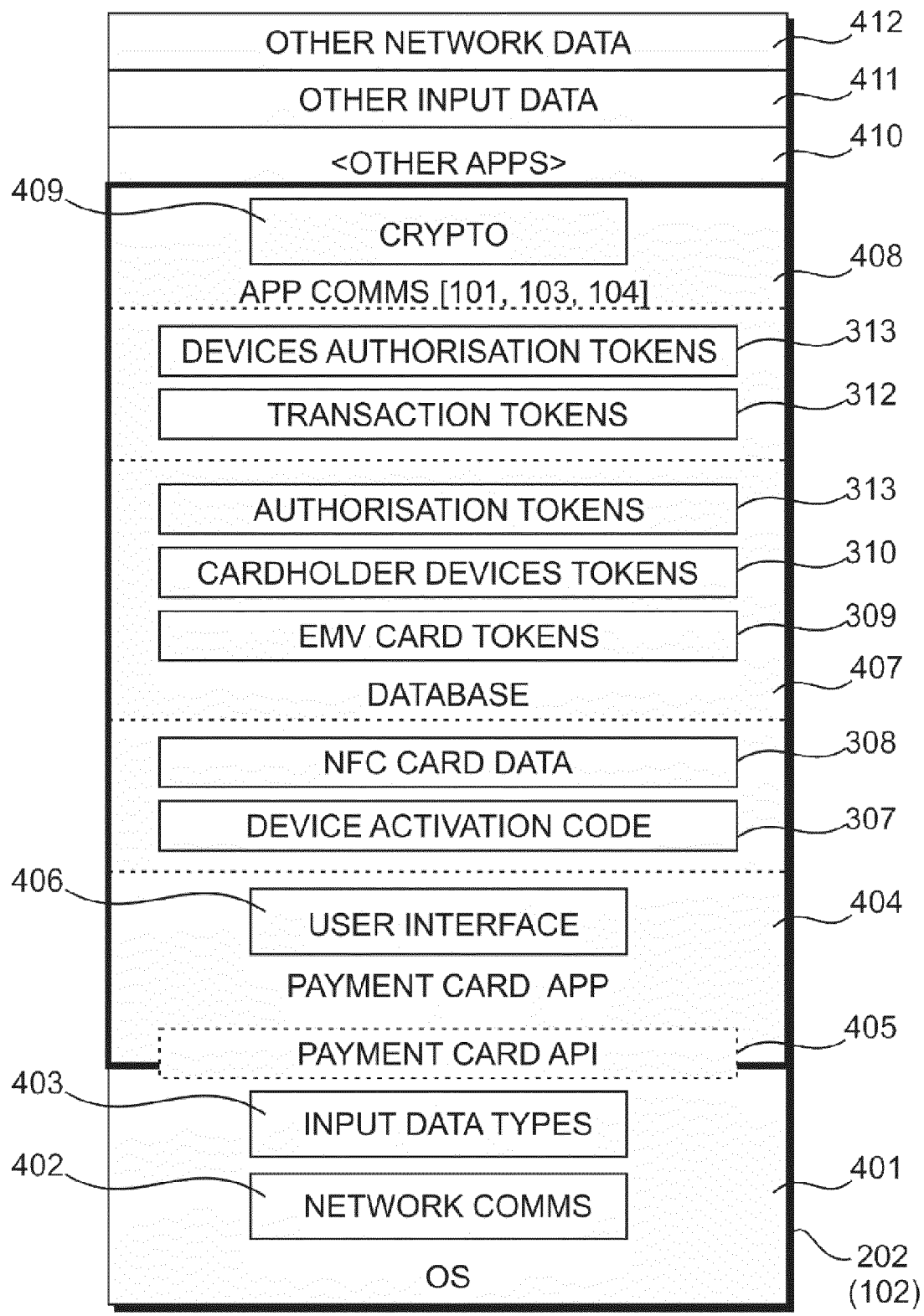
FIG. 4 illustrates the memory contents of the first server at runtime, including a set of instructions and a database storing a plurality of tokens.

With reference now to FIG. 4 now, and by contrast with FIG. 3, a logical diagram shows the contents of the memory means 202 of the first remote server 102 at runtime, when the data processing terminal is configured to both associate cardholder devices 101$_N$ with cards 106$_N$ and authenticate associated payment cards 106$_N$ during electronic transactions processed by merchant devices 104$_N$ in real-time.

An operating system is shown at 401 which, if the server 102 is for instance an desktop computing device manufactured by DELL® Inc. of Round Rock, Tex., USA, is Windows Server 2012 R2 distributed by Microsoft® Inc. of Redmond, Wash., USA. The OS 401 includes communication subroutines 402 to configure the data processing terminal 102 for bilateral network communication via an NIC interfaced with the wired connection 110 to the local router 111. The OS 401 also includes input subroutines 403 for reading and processing input data variously consisting of user direct input to human interface devices, namely a keyboard and a computer mouse.

Figure 6:
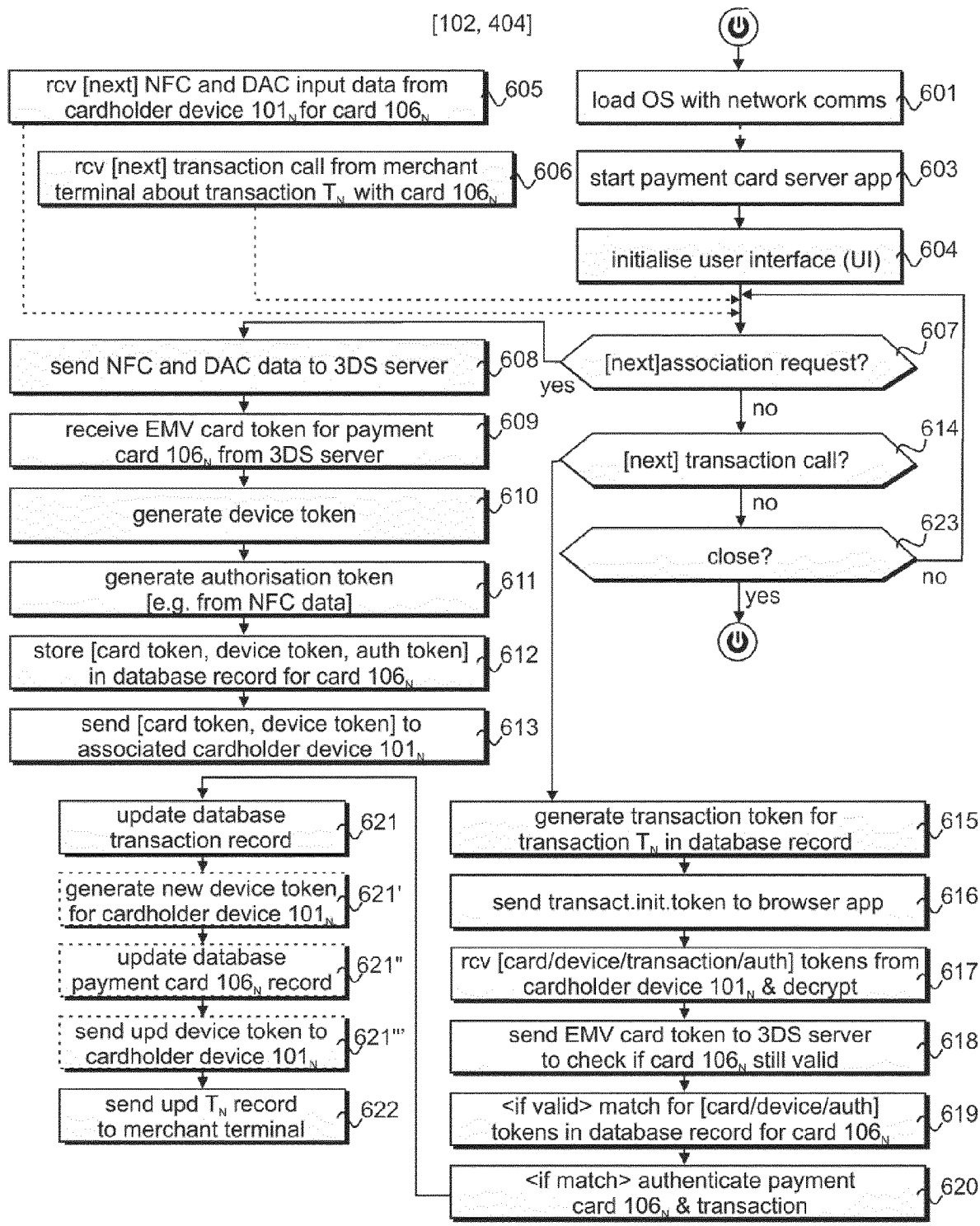
FIG. 6 details data processing steps performed by the cardholder device and the first server for authenticating the payment card in an electronic transaction processed in the networked system of FIG. 1 according to an embodiment of the present invention.

A payment card server application is shown at 404, which configures the server 102 to perform data processing steps described hereafter with reference to FIG. 6, which embody both the card payment associating and authenticating methods in the electronic payment network of FIG. 1 insofar as the first server 102 is concerned. The application 404 is interfaced with the OS 401, particularly the network communication and input data processing subroutines 402 and 403 of the OS 401, via one or more suitable Application Programmer Interfaces 405. Whilst the payment card server application 404 is processed by the first server 102 at runtime, the application instantiates a user interface 406 on a display unit connected to a video graphics output of the server for facilitating interaction with the server user.

The associating method is initiated and performed by the server application 404 for each association request received from a remote cardholder device 101 which includes both NFC card data 308 and a card-respective DAC 307. The server application 404 decodes each such request, then communicates the DAC 307 and NFC card data 308 to the second remote server 103 configured and operated either by the issuer of the payment card 106, or by the card scheme who has attributed the card PAN to the card issuer, for the second remote server 103 to perform a verification of the authenticity and validity of the payment card 106 based on the DAC 307 and card data 308 with a 3D Secure protocol and, in case of a positive verification, to return a token 309 uniquely representative of the verified card 106 and respective DAC 307 to the first server 102.

Accordingly, the server application 404 maintains a database 407 of card-respective records, wherein each record is instantiated for a successful association, and stores the token 309, together with both a cardholder device token 310 generated by the server 404 application to be uniquely representative of the requesting cardholder device 101 that initiated the association, and an authorisation token generated by the server 404 application on the basis of, in this embodiment, the card data 308 in the initial association request. Alternative embodiments contemplate generating the authorisation token 313 at the server 102 on the basis of data captured by the cardholder device CCD 211, such as a photograph or video frame of either the payment card or physical cardholder biometric feature(s) including the cardholder's iris or fingerprint(s), and/or on the basis of data captured by the device microphone 210 such as a voiceprint of the cardholder, in all cases uniquely representative of the card 106 and cardholder, wherein this data is encoded in the association request in addition to the card data 308. Accordingly still, a cardholder device 101 may be associated with a plurality of payment cards 106 of a same cardholder, each such association having a respective record in the database 407.

The authenticating method is initiated at the first server 102 for each transaction initialising request received from a merchant terminal 104 connected to the electronic payment system of FIG. 1 whereby, for each transaction, the server application 404 initialises a respective transaction record and generates and stores a corresponding transaction token 312 uniquely associated with the transaction in the database 407, then returns the transaction initialising code 311 to the merchant terminal 104 for output to the respective cardholder device 101 involved in the transaction.

The server application 404 accordingly also receives encoded communications from cardholder devices 101 involved in transactions for purposes of authenticating the payment card 106 involved therewith, wherein each such communication comprises a card token 309, a device token 310, the transaction token 312 and an authorisation token 313 generated by the sending mobile payment card application 304. The server application 404 is thus able to reconcile transaction records in the database 407 based on the transaction token 312 communicated by a cardholder device 101, and authenticate the payment card 106 based on a comparison of the co-communicated card token 309, device token 310 and authorisation token 313 against the stored card-respective records in the database 407.

The payment card application 404 thus also includes a communications module 408 for receiving card data 308 and DAC 307 from remote cardholder devices 101 and communicating same to the second remote server 103, receiving EMV issuer assured card tokens from the second remote server 103, communicating respective card tokens 309 and device tokens 310 to remote cardholder devices 101, communicating transaction initialising codes 311 to merchant terminals 104, receiving transaction-respective sets of tokens from remote cardholder devices 101 and communicating payment card authenticating outcomes to merchant terminals 104, across the networked environment of FIG. 1, wherein all such communications are encoded or decoded with a cryptographic subroutine 409 of the communications module 408 for purposes of data security.

Further local data 411 and network data 412 may be stored in the memory means 202 of the first remote server 102 at runtime, some or all of which may be processed either by the server application 404, or by or for other application(s) 410 being processed in parallel with the server application 404. An example of further local data is for instance local user input 411 read by the OS 401 in real time from the HiD devices, but which user input lies outside the user interface 406 of the application 304. An example of further network data is for instance remote application or OS updating data 412 communicated by a remote server over the WAN 105.

With reference to FIG. 5 now, after powering up a cardholder device 101 conventionally at step 501, either the associating functionality or the authenticating functionality of the payment card application 304 may be called. The associating functionality is called whenever a cardholder wishes to associate a new payment card 106 with the mobile device 101, having prealably received a card-respective device activation code 307 from the card issuer at step 502A. The payment card application 304 is accordingly started for the purpose at step 503 and, if the cardholder device 101 has never yet been associated with a payment card 106, the payment card application 304 may also be first downloaded at said step 503, and the user interface 306 is next instantiated on the device display 209 at step 504.

A first question is accordingly asked at step 505, asking to confirm that an association request should be sent for a payment card 106. When answered positively, then at step 506 the mobile application 304 request the cardholder to locate the payment card 106 proximate the cardholder device 101 for performing a NFC communication therebetween and for the mobile application 304 to obtain the card data 308. At a next step 507, the mobile application 304 request the cardholder to input the device activation code 307 in the user interface 306. At a next step 508, the mobile application 304 encrypts and communicates the NFC card data 308 and the DAC 307 to the remote server application 404 processed by the first remote server 101. At a final step 509, the mobile application 304 eventually receives the card token 309 and the device token 310 generated on the basis of the communicated card data 308 and DAC 307 from the first remote server 101 and stores the pair of tokens locally. Control thereafter returns to the question of step 505, allowing the mobile application 304 to start associating a next card 106 or, as described hereafter, to receive a transaction initiation code 311. Alternatively, the cardholder may terminate the mobile application 304 with a relevant input in the UI 306 or the OS 301, answering the question of step 515 positively.

The authenticating functionality is called whenever a cardholder initiates an electronic transaction with a payment card $106_N$ already associated with the cardholder device 101 at the first remote server 101 at step 502B. The payment card application 304 is accordingly started for the purpose at step 503 and the user interface 306 is next instantiated on the device display 209 at step 504. The question of step 505 is answered negatively and a next question is accordingly asked at step 510, asking to confirm that a transaction initiation code 311 has been received. When answered positively, then at step 511 the transaction initiation code 311 is processed to extract the transaction token 312. At a next step 512. the mobile application 304 request the cardholder to locate the payment card 106 proximate the cardholder device 101 for performing a NFC communication therebetween and for the mobile application 304 to obtain the card data 308. At a next step 513, the mobile application 304 generates the authorisation token 313 on the basis of the card data 308. At a next step 514, the mobile application 304 encrypts and communicates the stored card token 309, the stored device token 310, the extracted transaction token 312 and the locally-generated authorisation token 313 to the remote server application 404 processed by the first remote server 101.

With reference to alternative embodiments wherein the authorisation token is generated based on data other than, or additional to, the card data 308 which requires and NFC 'tap' of the payment card 106 with the cardholder device 101, such an alternative embodiment is shown in dotted lines in FIG. 5 as alternatives steps 512' and 513' which may be performed as an alternative to, or in addition to, steps 512 and 513 previously described, and wherein the authenticating data input step 512' requires the cardholder to scan their iris with the device CCD module 211 and the authenticating token generating step 513' accordingly generates the authenticating token from the image data of the cardholder's iris rather than from card data 308. Further, at an optional final step (not shown), the mobile application 304 may eventually receive a confirmation of authentication success or failure from the first remote server 101. Control thereafter returns to the question of step 505, allowing the mobile application 304 to start associating a next card 106 or to receive a next transaction initiation code 311.

If the successive questions of steps 505 and 510 are successively answered negatively, a final question is asked at step 515, as to whether the cardholder has input an mobile application closing command in the UI 306 or via the OS 301. If the question of step 515 is answered negatively, then the application logic loops and control returns to the question of step 505, allowing the mobile application 304 to start associating a next card 106 or to receive a next transaction initiation code 311. Alternatively, the application 304 is unloaded from the memory 202 and the cardholder device 101 may eventually be switched off.

With reference to FIG. 6 now, after powering up the first server 102 at step 601, the payment card server application 404 is loaded into the server memory and started locally at step 603, together with its database, and a user interface 406 is instantiated on the display unit of the server 102 at step 604. The server is then ready to process network communications to and from remote terminals consisting of cardholder devices 101N, remote merchant terminals 104 processing electronic payment card transactions, and the second remote server 103 of the card issuer or card scheme providing conventional 3DS processing of card data, for associating payment cards $106_N$ with respective cardholder devices $101_N$ and authenticating payment cards $106_N$ involved in electronic transactions $T_N$.

The associating functionality is called whenever a cardholder device communication comprising NFC card data 308 and a respective DAC 307 encoded therein, preferably in encrypted form, is received at any one time at a step 605. The authenticating functionality is called whenever a merchant terminal communication comprising card data 308, or a representative portion thereof sufficient to identify the payment card $106_N$ in the database, is received at any one time at a step 606. Communications are queued by the server application 404 and processed sequentially or in parallel, subject to the embodiment of the server application 404 taking advantage of the server central processing unit (CPU) architecture, particularly if it is a CPU with multiple, independently-addressable data processing cores.

A first question is accordingly asked at step 607, as to whether the next communication to process is an association request. When answered positively, then at step 608 the server application 404 decrypts the communication to extract the card data 308 and DAC 307 and forward same to the second remote server 103 for performing a conventional 3DS verification on the data and issue a token 309, which is either received at step 609 (normal case) or not if the 3DS verification fails. When the card token 309 is received, the server application 404 next generates a device token 310 at step 610, which may be any form of tokenisation apt to uniquely identify the cardholder device 101 within the system of FIG. 1.

At a next step 611, the server application 404 generates an authorisation token 313 based on, in this embodiment, the received NFC card data 308. With reference to the alternative, cardholder iris-based embodiment of steps 512', 513' in FIG. 5, the server application may instead generate the authorisation token 313 based on image data of the cardholder iris, which the mobile application 304 must request from the cardholder in the association request procedure prior to step 508.

At a next step 612, the server application 404 stores the card token 309 received from the second remote server 103, the device token generated at step 610 and the authorisation token generated at step 611 in a record of the database 407 which is, effectively, uniquely representative both of the payment card $106_N$ and its association with the cardholder device 101. At a final step 613, the server application 404 encrypts and sends the pair of card token 309 and device token 310 to the mobile application 304 at the remote cardholder device 101 for storing thereat.

Control thereafter returns to the question of step 607, allowing the server application 304 to process a next association request from a remote cardholder device 101 or, as described hereafter, to process a next transaction call from a remote merchant terminal 104. Accordingly, if the next communication to process is an authentication request, the first question of step 607 is answered negatively, and a next question is accordingly asked at step 614, asking to confirm whether a next transaction call has been received. When answered positively, then at step 615 the server application 404 first generates a transaction token 312 for the transaction in a respective database record. At a next step 616, the server application encodes the transaction token in a transaction initiation code 311 and communicates the code 311 to a remote browser application in use by the cardholder.

Adverting to steps 511 to 514 at the remote mobile application 304, the server application eventually receives the encrypted card token 309, device token 310, transaction token 312 and generated authorisation token 313 from the remote mobile application 304 and decrypts the communication at step 617. The server application 404 next sends the card token 309 to the second remote server for a conventional 3DS verification that the payment card 106 tokenized with the token 309 is still valid at step 618. The second remote server 103 ordinarily returns a positive verification whereby, at step 619, the server application 404 next attempts to match the card token 309, device token 310 and authorisation token 313 against a record of the database 407 storing the same card token 309, device token 310 and authorisation token 313. It will be appreciated that the steps at the second remote server can also be performed as the first remote server.

The matching operation ordinarily returns a positive result whereby, at step 620, the server application 404 authenticates the payment card 106 and the transaction, the respective transaction token 312 of which it updates, as well as the corresponding transaction record in the database 407 at step 621. The server application 404 finally communicates the updated authentication status to the corresponding merchant terminal 104 at step 622, such that processing of the electronic transaction may be completed according to any further conventional data processing steps outside the scope of the present disclosure.

Alternative embodiments of the authenticating method however contemplate additional steps intermediate the local transaction record update of step 621 and the communication step of the authentication outcome 622, which are also shown in FIG. 6 in dotted lines and implement additional security in the electronic transaction processing system. At a first intermediate step 621' that follows step 621, the server application 404 may generate a new device token 310 for the cardholder device 101 associated with the payment card 106 involved in the transaction, in compliance with PSD guidelines. At a next intermediate step 621", the server application 404 updates the device token entry in the corresponding database record with the new device token 310 and, at a final intermediate step 621''', the server application 404 encrypts and communicates the new device token 310 to the remote mobile application 304 at the cardholder device 101 for replacing the previous instance of the device token still stored thereat.

If the successive questions of steps 607 and 614 are successively answered negatively, a final question is asked at step 623, as to whether the next communication to process is a user interrupt input by the user of the server 102, for instance a server application closing command in the UI 406. If the question of step 623 is answered negatively, then the application logic loops and control returns to the question of step 607, allowing the server application 404 to process a next association request from a remote cardholder device 101 or to process a next transaction call from a remote merchant terminal 104. Alternatively, the application 404 is unloaded from the terminal memory and the server 102 may eventually be switched off, for instance for a hardware maintenance or upgrade task.

The present invention thus provides a distributed electronic transaction system, in which any payment card $106_N$ of a cardholder is easily, ergonomically and promptly associated with a cardholder device 101 during a single association procedure performed between the cardholder device 101 and the first remote server 102 with minimal input from the cardholder into the cardholder device 101, in a preferred embodiment consisting merely of an NFC communication of card data to the cardholder device 101 through e.g. a 'tap' of the card 106 against the device 101, and an input of 4 alphanumerical characters into a user interface. In that distributed electronic transaction system, the associated cardholder device 101 can subsequently provide the functionality of a multifactor authentication during any subsequent electronic transaction processed by the system, for which a merchant terminal 104 requires authentication of the payment card 106 involved in the transaction to comply with regulatory requirements, again with minimal input from the cardholder into the cardholder device 101, in a preferred embodiment consisting of only the NFC communication of card data to the cardholder device 101 through the 'tap' of the card 106 against the device 101.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method of associating a payment card of a cardholder with a cardholder device of the cardholder in an electronic payment network, the method comprising:
   providing the cardholder with the payment card and a device activation code for the cardholder device, wherein the payment card has a card number uniquely identifying the card in the electronic payment network;
   communicating, a first electronic message exchange between the cardholder device and a first remote server using a communications network, the payment card number and the device activation code from the cardholder device to the first remote server;
   obtaining, by the first remote server in a second electronic message exchange between the first remote server and a second remote server, an issuer assured card token generated by the second remote server in response to authentication of both the card number and the device activation code by the second remote server;
   generating, by the first remote server in response to the obtaining, a device token and an authorization token in response to receipt of the issuer assured card token from the second remote server;
   storing, by the first remote server, the issuer assured card token, the device token, and the authorization token in a data structure in a computer memory at the first remote server for identification of the cardholder device and the payment card from the device token and the authorization token without an exchange of payment card data over the communications network during a transaction;
   communicating, by the first remote server to the cardholder device, the issuer assured card token and device token to the cardholder device and storing same thereat; in response to initiation of the electronic transaction at a merchant terminal remote from the cardholder device and the first remote server, generating a transaction token associated with the electronic transaction at the first remote server;
   communicating, by the first server, the transaction token to the cardholder device by: (a) encoding the transaction token in a QR code and communicating the QR code, or (b) encoding the transaction token in a user-selectable button for rendering in a browser application or other user interface of the cardholder device;
   receiving, by the first server, the transaction token, an authorization token generated from an input of authenticating data in the cardholder device, and the issuer assured card token and device token stored as the cardholder device, and
   authenticating, at the first remote server, the electronic transaction based least in part on the transaction token received from the cardholder device and comparison of the received authorization token, issuer assured card token, and device token with the authorization token, issuer assured card token, and device token stored at the first server.

2. The method according to claim 1, wherein obtaining the issuer assured card token further comprises:
   communicating the card number and the device activation code from the first remote server to the second remote server;
   verifying respective validities of the card number and the device activation code at the second remote server with an issuer of the card; and
   generating the issuer assured card token in case of a positive verification at the second remote server.

3. The method according to claim 2, wherein the issuer assured card token is an EMV issuer assured card token.

4. The method according to claim 2, wherein verifying comprises the further step of processing the card number and the device activation code with an implementation of a 3D Secure protocol.

5. The method according to claim 1, wherein the card number is a primary account number (PAN) and communicating the card number to the first remote server further comprises inputting the PAN in the cardholder device through a near field communication (NFC).

6. The method according to claim 1, wherein the method comprises:
   communicating the card number and the device activation code from the first remote server to the cardholder device; and
   the communication of the card token and the cardholder device token to the cardholder device further comprises communicating the card token and the cardholder device token to a set of instructions.

7. The method according to claim 1, wherein generating the authorization token further comprises generating the authorization token based on at least one selected from the card number, card data, an image or photograph of the card, cardholder data, cardholder biometric data, one or more cardholder physical feature(s), one or more cardholder's facial feature(s), a cardholder's iris, a cardholder's fingerprint(s), a cardholder's vocal features.

8. The method according to claim 1, wherein the payment card is associated with the cardholder device of the cardholder prior to or during an electronic transaction processed in an electronic payment network.

9. The method according to claim 8, further comprising updating the cardholder device token after authenticating the electronic transaction.

10. The method according to claim 8, further comprising:
encoding a network address of the merchant terminal in the transaction token; and
communicating a notification of authentication to the merchant terminal at the network address after authenticating the electronic transaction.

11. The method according to claim 8, further comprising:
generating a new device token after authenticating the electronic transaction; and
updating the stored device token at the first remote server and at the cardholder device with the new device token.

12. The method according to claim 8, wherein inputting authenticating data in the cardholder device further comprises:
inputting a card number or card data through near field communication (NFC),
capturing physical features of the card through optical capturing means of the device,
capturing cardholder biometric data through the optical capturing means of the device,
inputting cardholder biometric data through the optical capturing means of the device,
inputting cardholder vocal data through audio capturing means of the device, or
a combination thereof.

13. The method according to claim 1, wherein the user-selectable button is an Intents button of an Android operating system.

14. A distributed electronic transaction processing system comprising at least one first remote server and at least one cardholder device of a payment card cardholder connected to a network, wherein the payment card has a card number uniquely identifying the card in the system, and wherein the system comprises:
the cardholder device configured to communicate a first electronic message exchange with the at least one first remote server using the network, wherein the first electronic message exchange communicates the card number and a device activation code to the at least one first remote server, to receive an authorization token and a device token from the at least one first remote server, and to store the authorization token and the device token as a token pair;
the at least one first remote server configured to receive the card number and the device activation code from the cardholder device in the first electronic message exchange, and to obtain, in a second electronic message exchange between the first remote server and a second remote server, an issuer assured card token generated by the second remote server in response to authentication of both the card number and the device activation code by the second remote server;
the at least one first remote server configured to generate the device token and the authorization token in response to receipt of the issuer assured card token, and to store the issuer assured card token, device token, and authorization tokens in a data structure in a computer memory at the first remote server and to communicate the issuer assured card token and device token to the cardholder device for storage threat; and
in response to initiation of the electronic transaction at a merchant terminal remote from the cardholder device and the first remote server, the first remote server configured to:
generate a transaction token associated with the electronic transaction at the first remote server,
communicate the transaction token to the cardholder device by: (a) encoding the transaction token in a QR code and communicating the QR code, or (b) encoding the transaction token in a user-selectable button for rendering in a browser application or other user interface of the cardholder device,
receive the transaction token, an authorization token generated from an input of authenticating data in the cardholder device, and the issuer card token and device token stored as the cardholder device, and
authenticate the electronic transaction based least in part on the transaction token received from the cardholder device and comparison of the received authorization token, issuer assured card token, and device token with the authorization token, issuer assured card token, and device token stored at the first server.

15. The system according to claim 14, wherein a second remote server is configured to verify respective validities of the card number and the device activation code with an issuer of the card, and to generate the issuer assured card token in case of a positive verification.

16. The system according to claim 14, wherein the issuer assured card token is an EMV issuer assured card token.

17. The system according to claim 16, wherein a second remote server is configured to process the card number and the device activation code with an implementation of a 3D Secure protocol.

18. The system according to claim 14, wherein the cardholder device comprises wireless networking means, the card number is a primary account number (PAN) and the card number is input to the cardholder device through a near field communication (NFC).

19. The system according to claim 14, wherein the cardholder device is further configured to communicate the card number and the device activation code from the at least one first remote server to the cardholder device, and wherein the at least one first remote server is further configured to communicate the card token and the device token to a set of instructions.

20. The system according to claim 14, wherein the at least one first remote server is further configured to update the transaction token after authenticating the electronic transaction.

21. The system according to claim 14, wherein the at least one first remote server is further configured to encode network address of the merchant terminal in the transaction token, and to communicate a notification of authentication to the merchant terminal at the network address after authenticating the electronic transaction.

22. The system according to claim 14, wherein the at least one first remote server is further configured to generate a new device token after authenticating the electronic transaction, and to update the stored device token at the at least one first remote server and at the cardholder device with the new device token.

23. The system according to claim 14, wherein the cardholder device comprises wireless networking means and imaging means, and both the cardholder device and the at least one first remote server are further configured to generate the authorization token based on at least one selected from the card number, card data, an image or photograph of the card, cardholder data, cardholder biometric data, one or more cardholder physical feature(s), one or more cardholder's facial feature(s), a cardholder's iris, a cardholder's fingerprint(s), a cardholder's vocal features.

24. The system according to claim 14, wherein the user-selectable button is an Intents button of an Android operating system.

25. The system according to claim 22, wherein the cardholder device is selected from a group comprising: desktop computers, mobile telephone handsets, tablet computers, portable computers, personal digital assistants, portable media players, portable game consoles.

26. A non-transitory computer readable storage medium, having one or more instructions stored thereon, which when executed by one or more computer processors, cause the one or more computer processors to perform operations for associating a payment card of a cardholder with a cardholder device of the cardholder in an electronic payment network, the operations comprising:
- providing the cardholder with the payment card and a device activation code for the cardholder device, wherein the payment card has a card number uniquely identifying the card in the electronic payment network;
- communicating, a first electronic message exchange between the cardholder device and a first remote server using a communications network, the payment card number and the device activation code from the cardholder device to the first remote server;
- obtaining, by the first remote server in a second electronic message exchange between the first remote server and a second remote server, an issuer assured card token generated by the second remote server in response to authentication of both the card number and the device activation code by the second remote server;
- generating, by the first remote server in response to the obtaining, a device token and an authorization token in response to receipt of the issuer assured card token from the second remote server;
- storing, by the first remote server, the card token, the device token, and the authorization token in a data structure in a computer memory at the first remote server for identification of the cardholder device and the payment card from the device token and the authorization token without an exchange of payment card data over the communications network during a transaction; and
- communicating, by the first remote server to the cardholder device, the issuer assured card token and device token to the cardholder device and storing same thereat;
- in response to initiation of the electronic transaction at a merchant terminal remote from the cardholder device and the first remote server, generating a transaction token associated with the electronic transaction at the first remote server;
- communicating, by the first server, the transaction token to the cardholder device by: (a) encoding the transaction token in a QR code and communicating the QR code, or (b) encoding the transaction token in a user-selectable button for rendering in a browser application or other user interface of the cardholder device,
- receiving, by the first server, the transaction token, an authorization token generated from an input of authenticating data in the cardholder device, and the issuer assured card token and device token stored as the cardholder device; and
- authenticating, at the first remote server, the electronic transaction based least in part on the transaction token received from the cardholder device and comparison of the received authorization token, issuer assured card token, and device token with the authorization token, issuer assured card token, and device token stored at the first server.

* * * * *